Jan. 11, 1927.

A. LEES 1,613,896

MUSICAL TOY

Filed Nov. 3, 1925

INVENTOR
Alfred Lees
BY
his ATTORNEYS

Patented Jan. 11, 1927.

1,613,896

UNITED STATES PATENT OFFICE.

ALFRED LEES, OF NEW YORK, N. Y.

MUSICAL TOY.

Application filed November 3, 1925. Serial No. 66,649.

This invention relates specifically to a familiar toy, comprising a disk and a pair of cords passing through the same, close to and on opposite sides of its center. In use the opposite ends of the cords are grasped by the hands, and by alternately stretching and relaxing the cords, the disk is made to whirl rapidly, first in one direction and then in the other. By the revolution of the disk the operating cords are coiled spirally, then uncoiled, and then coiled spirally in the opposite direction.

The main feature of novelty in the present invention is the utilization of the whirling motion of the disk to create currents of air through suitable ducts in the body of the disk, which air-currents, acting upon a simple form of sound producing device, of the wind-instrument variety (such as a harmonica reed, or other vibrant member) produce a musical note (or chord) so long as the disk is whirling round. The volume of the sound varies with the force of the air-current; and this in turn depends upon the rapidity of rotation of the disk. Therefore the volume of the sound can be controlled in a measure by the user, and made to increase and diminish at pleasure. The device, when properly constructed, can be made to produce a tone of remarkable loudness considering the relative feebleness of air-currents producible by the means described.

Other and various sound effects may be produced; as by having a group of three or more sound boxes symmetrically disposed around the center of the disk, each having a different pitch from the others.

A simple embodiment of the said invention is hereinafter described in detail. The disk is made of two thin circular plates, which may be of glazed cardboard, rubberoid, celluloid, aluminum, or like material, comparatively stiff and somewhat resonant. Between these two plates are flat spacing pieces, say of cork or light cardboard, stamped out in such shape as to form flaring air ducts extending from the center to the circumference of the disk. At the center is a sound-box. It may be made of hard rubber or rubber-substitute, or of metal. In each of its opposite faces, which are flush or nearly so with the top and bottom of the disk, is an air inlet, properly shaped and proportioned, and provided with a vibrant sound producing device, which may be a thin rubber band of a width to overlap slightly the air inlet. A diagonal web or partition divides the sound-box into two chambers, from each of which leads one of the air ducts referred to above. These ducts flare outwardly trumpet-like, and, with the resonant plates, which form the walls thereof, they constitute sound amplifying devices.

In use the whirl of the disk sets in motion, by suction, a current of air, which enters through the sound producing inlet of the sound-box and escapes by the expanded opening at the circumference of the disk.

When care and accuracy are exercised in forming the sound inlets and vibrant members, and the several parts proportioned in a manner which will be readily understood by those skilled in the acoustical art, a very pleasing note or notes can be produced; moreover, the simplicity of the construction as a whole, and the cheapness of all the materials employed in the fabrication of the device, permit of quantity production at a very low cost; this being a prime consideration in the manufacture of articles of this class.

One form in which the inventive idea may be embodied is shown in the accompanying drawings, which form part of this specification, and in which—

Figure 1:
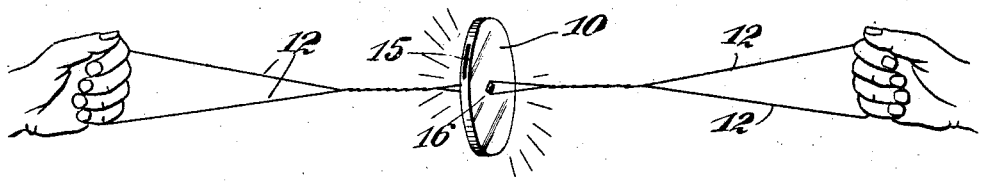
Fig. 1 is a perspective view showing the appliance in use.
Figure 2:
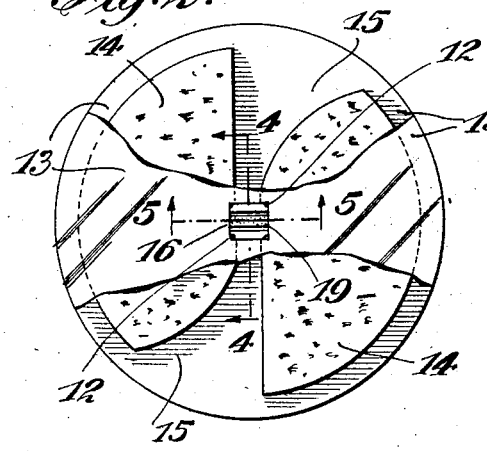
Fig. 2 is a top view (full size) partly broken away.

Referring to the drawings, in which like reference characters indicate like parts throughout the several views, the whirling disk 10 is operated by means of the cords 12, as shown in Fig. 1. In the construction illustrated in the drawings, the disk is made of two circular plates 13 (of cardboard, fibroid, celluloid, aluminum, or other suitable material) which enclose between them the flat spacing pieces 14, of cork or light cardboard. The pieces 14 are so shaped as to form two amplifying sound ducts 15, which lead from the center to the circumference of the disk, and which expand or flare outwardly, giving them a trumpet shape. Preferably each of these passages has one side straight and the other curved, as shown in Fig. 2; it having been found that this construction gives improved sound effects. The plates 13 form resonant walls to the sound ducts.

Figure 4:
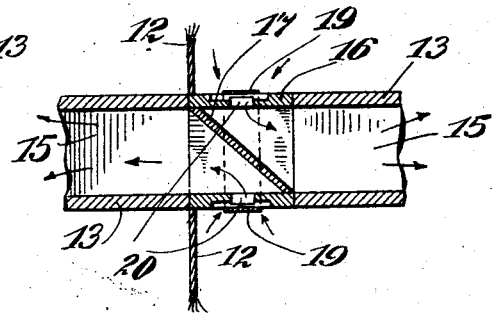
Fig. 4 is an enlarged sectional view on line 4—4, Fig. 2.
Figure 3:
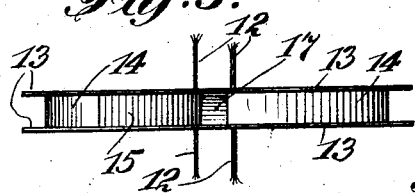
Fig. 3 is a side elevation of Fig. 2.

Preferably, the sound-box 16 is approximately cubical in form, and of duplex construction; that is to say, it has two sound producers, one for each of the two sound ducts. This construction has important advantages from the manufacturing standpoint, as it facilitates production and assembling. The sound-box is made to fit closely in an opening which extends through the disk at its center. Two of its opposite sides are open for communication with the sound ducts, as shown in Fig. 4. A diagonal web or partition 17 divides the sound-box into two chambers, and completely separates the two sound ducts the one from the other, while at the same time acting as a deflector for the sound waves produced by the elements now to be described.

Figure 5:
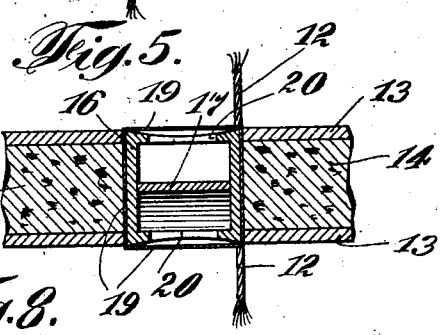
Fig. 5 is a like view on line 5—5, Fig. 2.

The top and bottom faces of the sound-box have each a sound producing device of the wind-instrument variety. As shown, the duplex sound producer is formed by two oppositely disposed oblong air inlet slots 20 (say three-sixteenths of an inch long by one-sixteenth wide) with which cooperates a suitable vibrant or pulsatory member, here shown as a rubber band 19 surrounding the box, which is grooved to receive it. The rubber band overlies the slots 20, and is of a width slightly greater than that of the slots. The groove faces in which the slots are formed are slightly concave (Figs. 5 and 6).

In a device thus constructed, the rapid whirling motion of the disk causes the air to be exhausted by suction through the wide mouths of the air ducts 15, thus creating a current of air, which enters through air inlet slots 20, between the edge thereof and the overlying rubber band 19. This throws the latter into rapid vibrations or pulsations, producing a musical note whose loudness and pitch depend respectively upon the amplitude and rapidity of the vibrations or pulsations, the sound waves thus generated being deflected outwardly through the ducts 15 by the partition 17.

Figure 6:
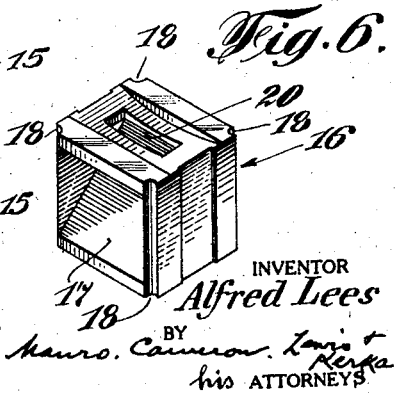
Fig. 6 is a perspective view of a duplex sound-box enlarged.

The sound-box is formed with grooves 18 at its four parallel edges which are transverse to the disk when the box is in place (Figs. 2 and 6). These grooves form passages through the disk; and through two of them (diametrically opposite each other) the operating cords 12 are threaded. Thus the passages for the cords are formed automatically, so to speak, by the mere assemblage of the parts. This detail of construction not only saves the operation of drilling holes for the cords, but it provides also a construction such that the side pressure of the cords when the device is in use cannot effect any dislocation of the sound-box, or interfere with its proper operation. This was a problem which, in the experimental development of the invention, presented considerable difficulty.

Inasmuch as the sound-box is preferably of duplex construction and its duplicate sets of parts are symmetrically arranged, it is reversible as to position, so that in assembling it is immaterial which of the two faces that carry the sound producers is uppermost. The arrangement of the four parallel grooves also contributes to the facility with which the parts may be assembled. In fact the whole device in all its details has been so designed as to admit of being manufactured of the cheapest materials, and of being put together in the most expeditious, and hence most economical, way.

Figures 7, 8:
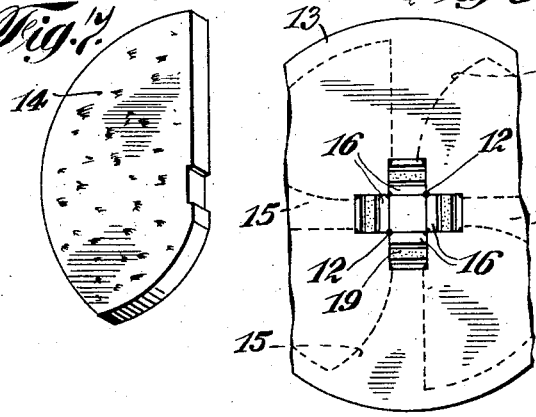
Fig. 7 is a detail of one of the spacing pieces.
Fig. 8 is a top view of a modification, showing a disk provided with a group of four sound-boxes.

In Fig. 8 is shown a modification in which there are four sound-boxes symmetrically grouped around the center of the disk. Other modifications may obviously be made without departing from the spirit of the invention.

I claim as my invention, and desire to secure by Letters-Patent:

1. The combination of a whirling disk having a plurality of independent air passages, with a removable and reversible duplex sound-box separating said passages and having a plurality of sound-producing devices communicating one with each of said air passages.

2. The combination with a whirling disk and its operating cords, of a removable sound-box, square in cross section, having grooves transverse to the disk, forming with the body of said disk, passages through which the cords may be threaded.

3. The combination with a whirling disk having two interior sound passages flaring outwardly, of a removable and reversible sound-box, having duplicate sound producing devices, and a sound deflector between each of said sound producing devices and said flaring passages.

4. The combination with a whirling disk having interior sound passages, of an approximately cubical sound-box, of rigid material, resting when in place in a square socket in the center of said disk, the corners of said sound-box being grooved transversely to said disk to form eyes for the operating cords.

5. In a device of the character described, the combination of a whirling disk and a centrally located sound-box, said box having slots in two of its oppositely disposed sides and a diagonally disposed partition between said slots, a vibrant member associated with each slot, and outwardly flaring sound-conveying conduits extending one on each side of said partition toward the circumference of said disk.

6. In a device of the character described, the combination of a whirling disk, a sound-box of angular cross-section centrally located in said disk, a sound-deflector therein, and a sound-producing device formed in one face thereof, with an outwardly flaring sound passage having its smaller end communicating with said sound-box adjacent the deflector and its larger or flared end open toward the circumference of the disk.

7. In a device of the character described, the combination of a whirling disk, a sound-box angular in cross-section centrally located within said disk and having a diagonally disposed sound deflector extending across the sound-box and from one side to the other of said disk, cord-receiving grooves formed in the angles of the sound-box extending from one side to the other of said disk, said box having concave grooves in its opposite face members each of which grooves is provided with a slot, and a vibrant member associated with each of said slots.

8. The combination with a whirling disk, of a sound-box having an air inlet, a vibrant member located thereat, said disk being provided with an interior air duct extending from its circumference to the said sound-box, and a partition within said sound-box for deflecting into the said air duct sound waves set in motion by the vibrant member.

9. A sounding toy comprising a pair of face plates, sound-producing means carried thereby, and spacing pieces enclosed between said face plates, the said spacing pieces being themselves spaced from each other and forming, with the face plates, air passages communicating with said sound-producing means.

10. In combination, a pair of disks, a sound-box carried thereby, and spacing pieces enclosed between said disks, the said spacing pieces being themselves spaced from each other and forming, with the disks, sound passages communicating with the sound-box.

11. In a device of the character described, the combination of a pair of disks, a sound-box supported centrally thereof, and spacing pieces enclosed between said disks, the said spacing pieces being themselves spaced from each other and forming, with the disks, outwardly flaring sound passages which extend from the sound-box to the circumference of the disks.

12. In a device of the character described, the combination of a pair of disks, a sound-box supported centrally thereof and having a sound-deflector in the form of a diagonal partition therein, and spacing pieces enclosed between said disks, said spacing pieces being themselves spaced from each other and forming with the disks outwardly flaring sound-passages communicating with said sound-box one on each side of said partition.

13. In a device of the character described, the combination of a pair of disks, a sound-box rectangular in cross-section and centrally supported therein, spacing pieces enclosed between said disks and each having a cutout portion fitting one side of said sound-box, said spacing pieces being spaced from each other and forming with the disks outwardly flaring sound passages, and a plurality of sound-producing elements carried by said sound-box and each having independent communication with one of said flaring passages.

In testimony whereof I have signed this specification.

ALFRED LEES.